INVENTORS
Donald N. Meyers
Zbysla M. Ceoleon

INVENTORS
Donald N. Meyers
Zbyslaw M. Ciołkosz

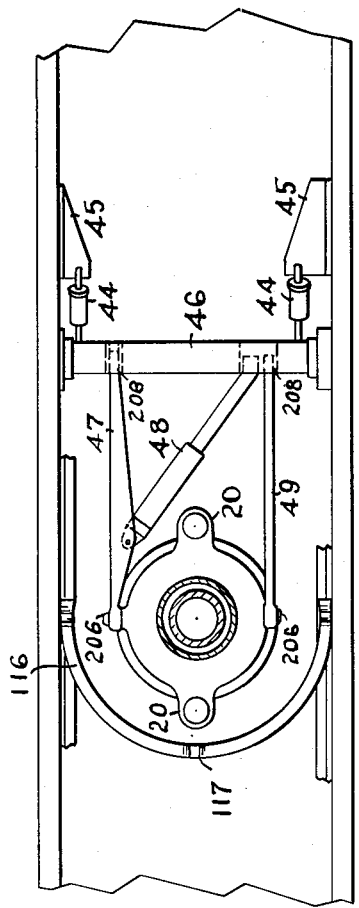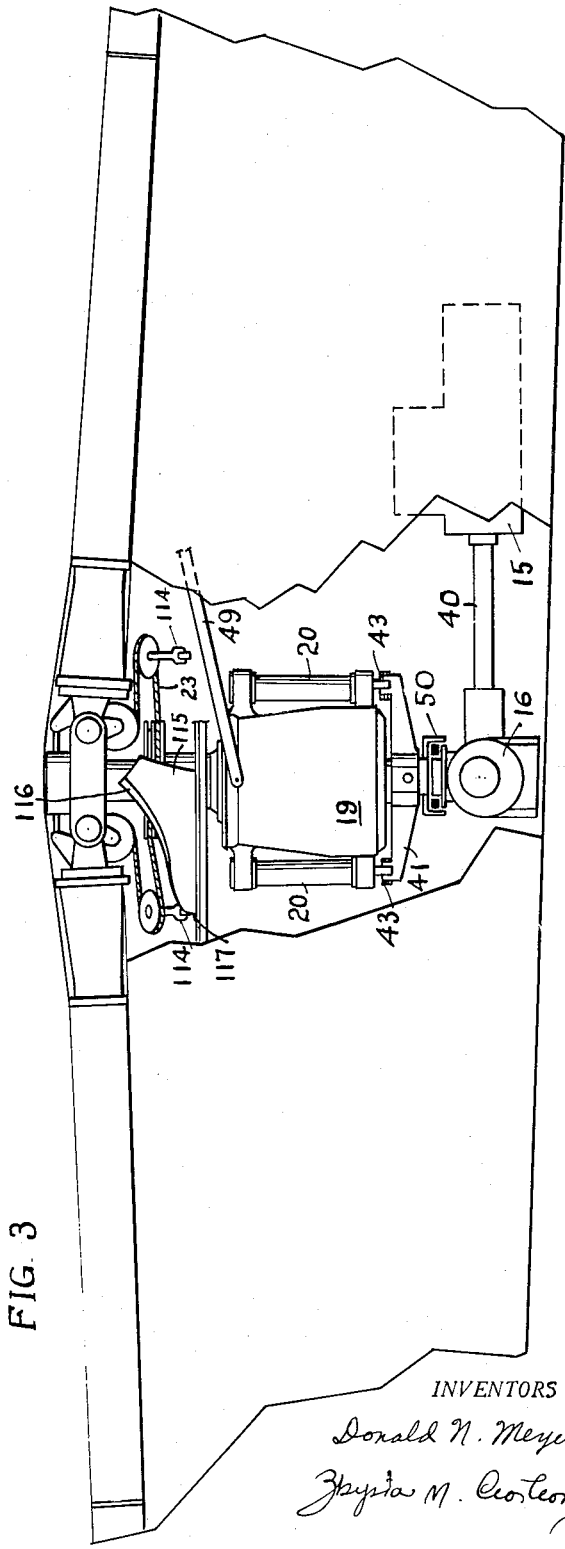

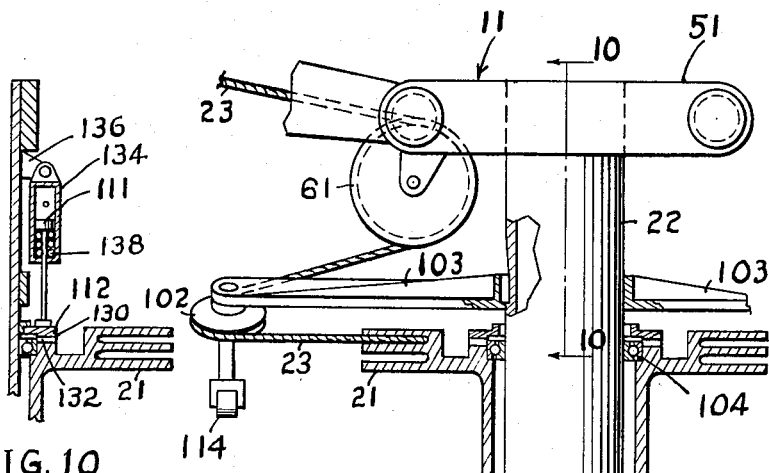
FIG. 10
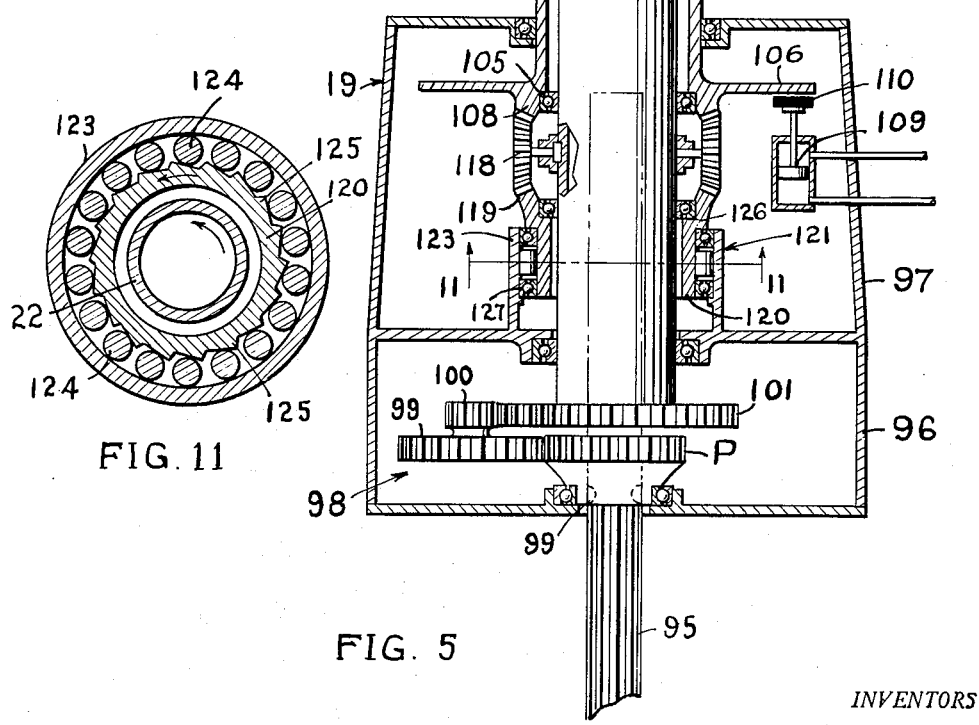
FIG. 11
FIG. 5
INVENTORS
Donald N. Meyers
Zbyslaw M. Ciolkosz

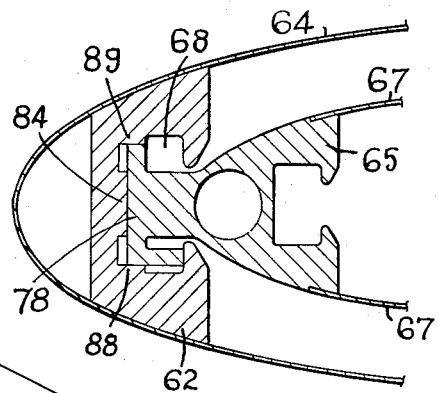
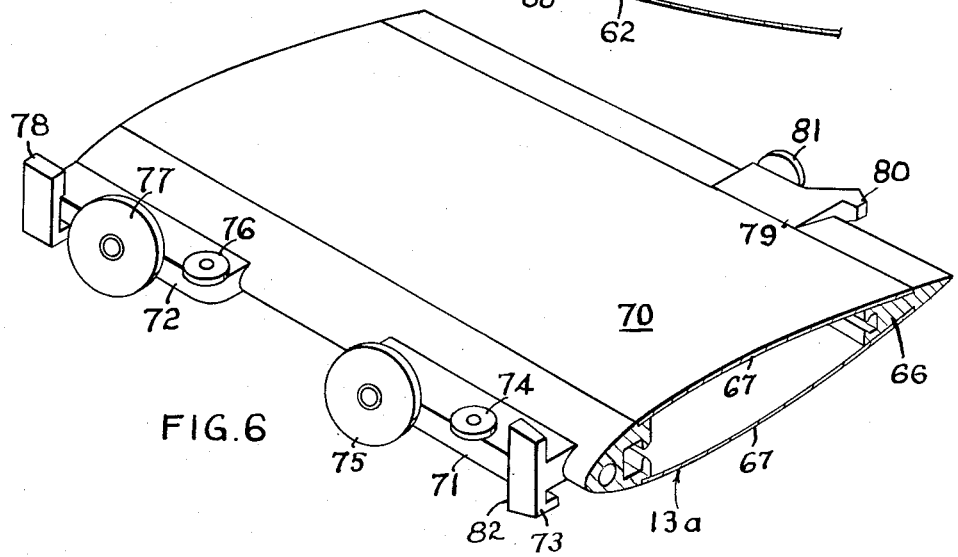
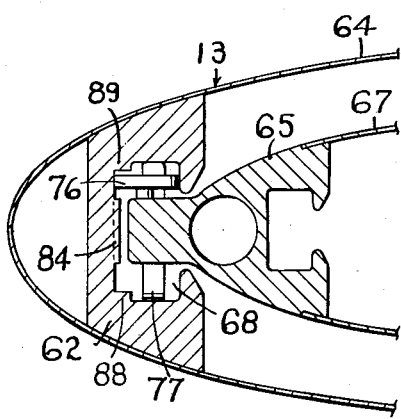
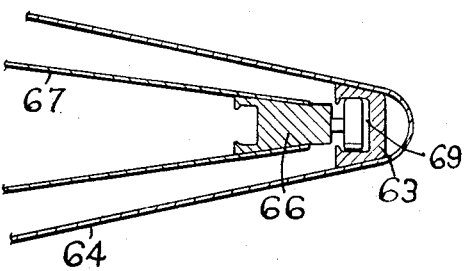

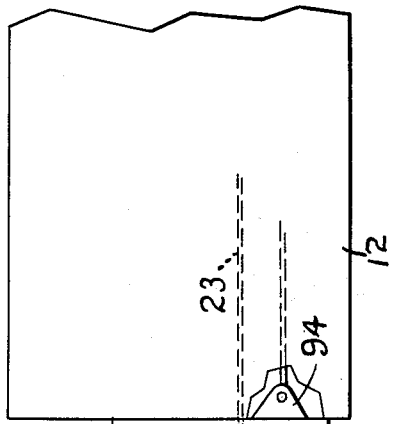
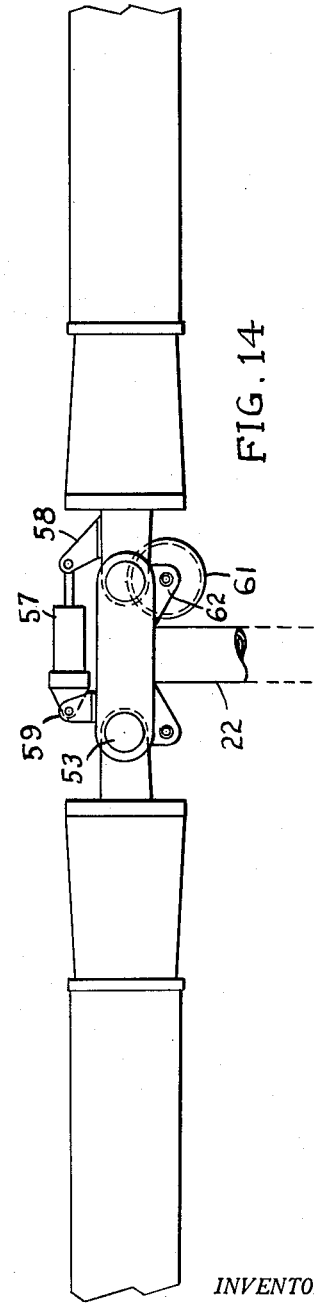
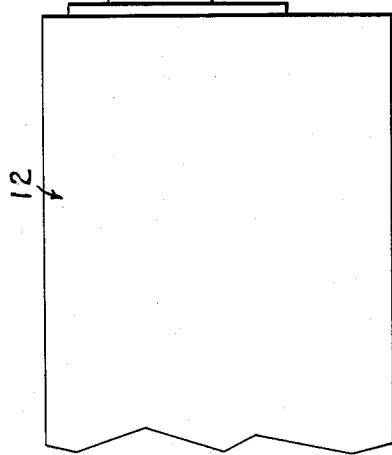

June 5, 1956 D. N. MEYERS ET AL 2,749,059
AIRCRAFT WITH RETRACTABLE VARIABLE RADIUS ROTARY WING
Filed Oct. 22, 1952 8 Sheets-Sheet 8
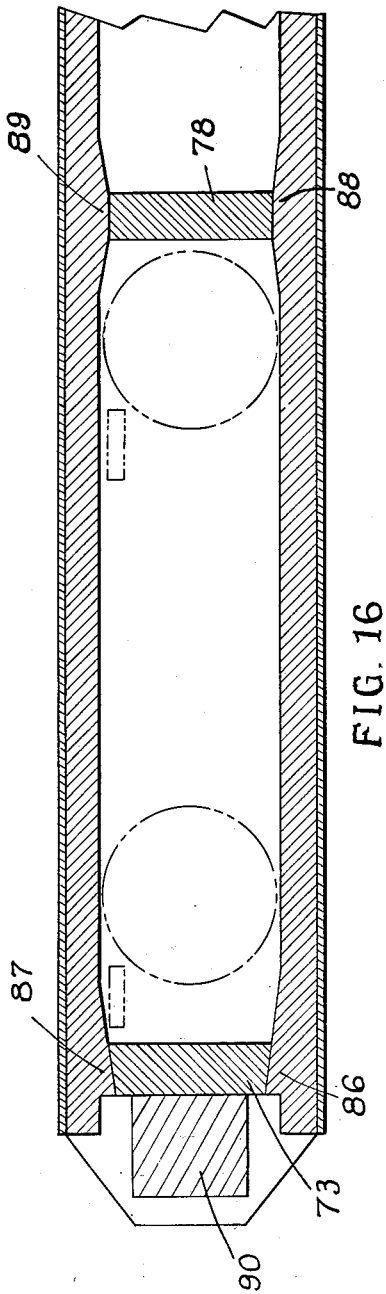
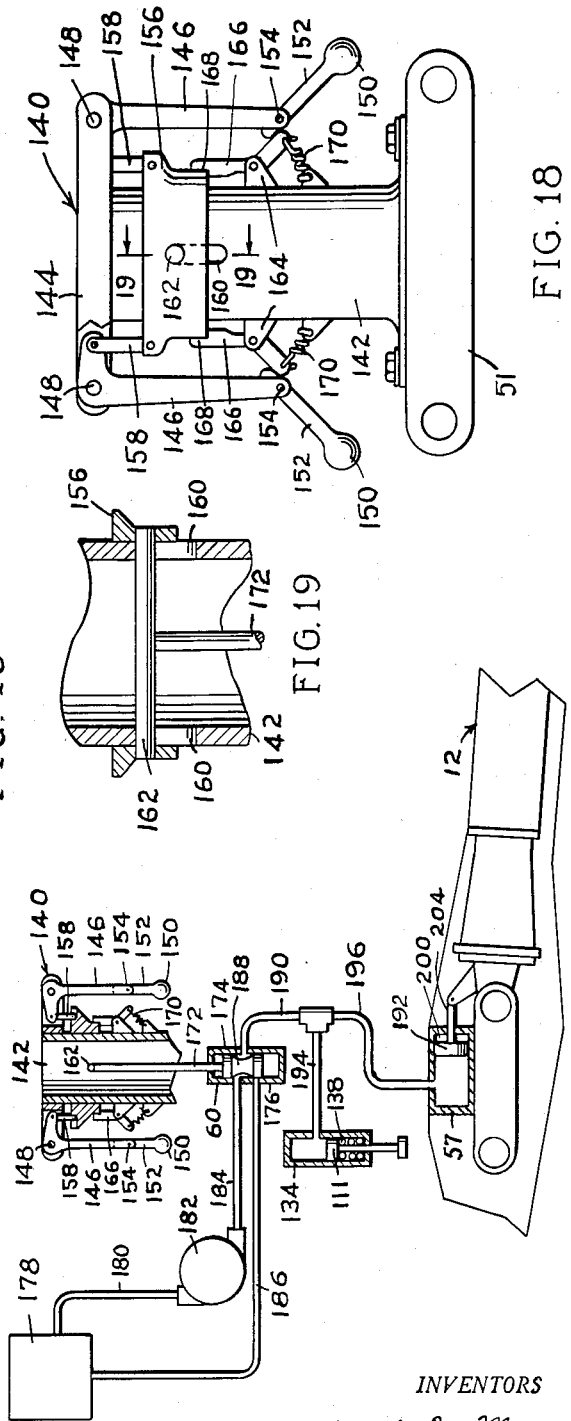
INVENTORS
Donald N. Meyers
Zbyslaw M. Ciotkosz United States Patent Office 2,749,059
Patented June 5, 1956

2,749,059

AIRCRAFT WITH RETRACTABLE VARIABLE RADIUS ROTARY WING

Donald N. Meyers, Philadelphia, and Zbyslaw M. Ciolkosz, Glenolden, Pa., assignors to Vertol Aircraft Corporation, a corporation of Pennsylvania Application October 22, 1952, Serial No. 316,228

7 Claims. (Cl. 244—7)

This invention relates to rotating wing aircraft and is concerned with the type of aircraft having a rotating wing of relatively large disc area, the diameter of which can be varied to facilitate relatively compact disposal of the rotor when not in use. The rotor is utilized to provide lift for take-off, slow speed, and landings. High forward speeds are attained by forward thrust means and lift from wing surfaces after the rotor is retracted into the fuselage.

This invention permits conversion from a helicopter to a true fixed wing aircraft for high speed flight, and eliminates the aerodynamic and structural impediments and unknowns imposed on a rotor at high translational speeds. A two bladed rotor system is contemplated in this invention although more than two blades may be used. Each blade is hinged to the hub of the rotor and consists of a plurality of telescoping sections. Provision is also made to vary cyclically and collectively the pitch of the blades while in use. When the aircraft reaches a predetermined transitional speed, the air load is transferred from the rotor to the fixed wing and the blades may be slowed down, telescoped, stopped, aligned fore and aft with the fuselage and completely retracted into a recess in the upper portion of the fuselage. During retraction into upper surface of the fuselage the blades are negatively coned so that the upper surface of the blades completes the fairing of the upper surface of the fuselage.

The principal object of this invention is to provide an aircraft including a mechanism for telescoping the rotor blades by means of the rotation of the rotor itself; i. e., the energy required to telescope the blades against centrifugal force comes from the kinetic energy of rotation of the rotor.

Another object of this invention is to provide an aircraft including novel mechanism for telescopically retracting the blades of a rotor by means of cables which are wound on a drum concentric with the rotor shaft. The drum normally rotates freely at rotor r. p. m. but is held stationary by a torque-limiting brake when the blades are retracted by the kinetic energy of rotation of the rotor.

Another object of this invention is to provide an aircraft including novel means for telescopically extending the rotor blades by means of the centrifugal force generated by the rotation of the rotor blades.

Another object of this invention is to provide means to restrain the rate at which said rotating blade sections are extended, said means being employed to impart a change in the rate of rotation of said rotor.

A further object of this invention is to provide means for applying negative coning to the blades of a rotor and aligning and lowering the blades of said rotor into a recess in the upper portions of the fuselage of the aircraft, so that the upper surface of the blades normally form a continuous part of the upper surface of said fuselage.

A still further object of this invention is to provide a plurality of telescoping blade sections using milled guideways, lugs, and rollers.

Another object of this invention is to provide rotor hub and blade pitch controls including extension and retraction mechanism to raise and lower the rotor hub from and into the fuselage of the aircraft, said mechanism being constructed so that no pitch changes are introduced in the rotor blades during the raising and lowering operation.

Further objects of the invention will hereinafter appear.

For a better understanding of the invention, reference may be had to the accompanying drawings wherein Figure 1 is a three-quarter pictorial view of the aircraft in elevation.

Figure 3 is a view similar to Figure 2 showing the rotor hub lowered and the blades nested in the recess in the top position of the fuselage.

Figure 4 is a plan view of the rotor hub showing means to damp out vibrations of the same.

Figure 5 is a partial section taken along line 5—5 of Figure 2 showing the blade telescoping mechanism.

Figure 6 is a diagrammatic view showing details of telescoping apparatus of the rotor blades.

Figure 8 is a sectional view taken along line 8—8 of Figure 7.

Figure 9 is a sectional view taken along 9—9 of Figure 7.

Figure 10 is a sectional view taken along line 10—10 of Figure 5 showing the hydraulic means for actuating a detent in the form of a ratchet on the rotor shaft which prevents the cable drum from turning.

Figure 11 is a sectional view taken along line 11—11 of Figure 5 showing details of the overrunning clutch used in extending the rotor blades.

Figure 12 shows a plan view of the rotor hub with the blade dampers removed.

Figure 13 is a view similar to Figure 12 showing the blade dampers installed.

Figure 14 is an elevation view of the rotor hub showing the blade damper on the near side.

Figure 15 is a sectional view taken along line 15—15 of Figure 7 of the trailing edge portions of the blades in telescopic engagement.

Figure 16 is a sectional view taken along the line 16—16 of Figure 7 and rotated 180° counterclockwise.

Figure 17 is a schematic view showing hydraulic means for actuating the negative coning and cable drum locking actuators.

Figure 18 is a view of the fly weight hydraulic valve actuating mechanism.

Figure 19 is a sectional view taken along the lines 19—19 of Figure 18.

Figure 1:
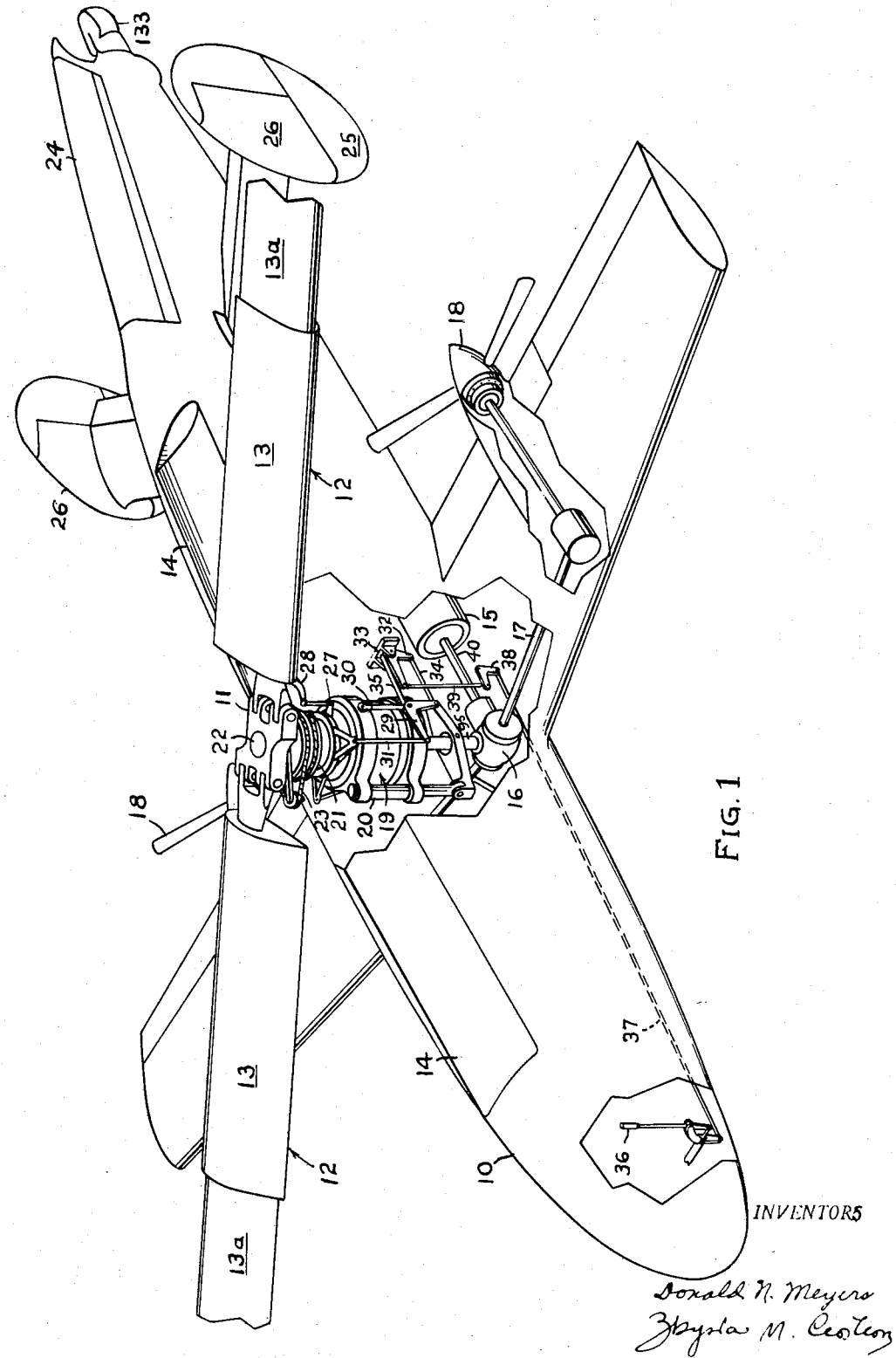

Referring to Figure 1, there is shown a general view of the aircraft having a fuselage 10 partially broken to show the details of the rotor retraction mechanism. A two-bladed rotor 11 is shown in flight condition, each blade 12 being of a plural-section telescoping sliding type.

Two sections 13, 13a are shown, the details of the sliding mechanism being reserved for a later discussion. With the blade sections 13 and 13a retracted and properly aligned, the entire rotor 11 can be retracted into recess 14 which extends along the top portion of the fuselage 10. A power unit 15 is geared by shaft 40 to central lower transmission 16. Initial gear reduction is accomplished and outputs are provided by transmission 16. Drive shafts 17 extend from said transmission to each propeller 18 mounted on the fixed wing and the upper section of the central transmission 19 is connected to said transmission by a shaft 95. Propellers 18 are of the controllable pitch pusher type which provide forward thrust for high speed flight and assist in compensating for rotor torque reaction during flight in the helicopter regime. The upper central transmission 19 includes a further gear reduction unit and blade retraction mechanism. The latter consists chiefly of a bevel planetary gear train and a hydraulically operated friction disc brake and overrunning clutch which will be separately described hereinafter. A pair of hydraulic rotor jacks 20 (only one is illustrated in Figure 1) automatically elevate or lower the entire rotor system 11 and the upper central transmission 19 as the initial or final step of the extension or retraction sequence. A blade retraction cable drum 21 concentric with rotor shaft 22 normally rotates at rotor R. P. M. During retraction, drum 21 is held stationary by a brake in the upper section of central transmission 19 causing cable 23 to wind onto the drum, thereby retracting the blades. Tailpipe 133 is mounted to discharge gases from power unit 15 toward the starboard side to partially compensate for rotor torque reaction present during helicopter flight. In high speed flight the exhaust jet is directed straight aft for added thrust. To further compensate for torque reaction during flight in helicopter regime downwash deflector 24 and lower portions 25 of end plates 26 are provided. These latter surfaces serve as vertical fin areas in high speed flight, contributing to directional stability.

Provision is made for pitch change of the rotor blades by means of a conventional swash plate 27 linked to a pitch horn 28 integrally secured to the leading edge of each blade. Floating controls are mounted so that motion of the rotor 11 into and out of recess 14 introduces no pitch changes in the rotor blades. The controls include a bell crank 29 mounted on upper transmission 19 at its fulcrum by means of links 30 and the end of its horizontal arm is connected by means of vertical link 31 to swash plate 27. A second bell crank 32 is mounted at its fulcrum to a bracket 33 which is affixed to structure of the aircraft. The vertical arms of bell cranks 29 and 32 are connected by means of link 34 and the location of the fulcrum of bell cranks 29 is maintained a fixed distance from the fulcrum of bell crank 32 by means of link 35. Actuation of control stick 36 in a fore and aft direction moves control rod 37, bell crank 38, and vertical link 39 to actuate the aforementioned bell cranks 32 and 29, and swash plate 27. However, by reason of the arrangement of the links 34 and 35, vertical movement of upper central transmission 19 and bell crank 29 therewith does not cause rotation of bell crank 29 and the pitch change of the rotor blades is not affected by such movement.

Figure 2:
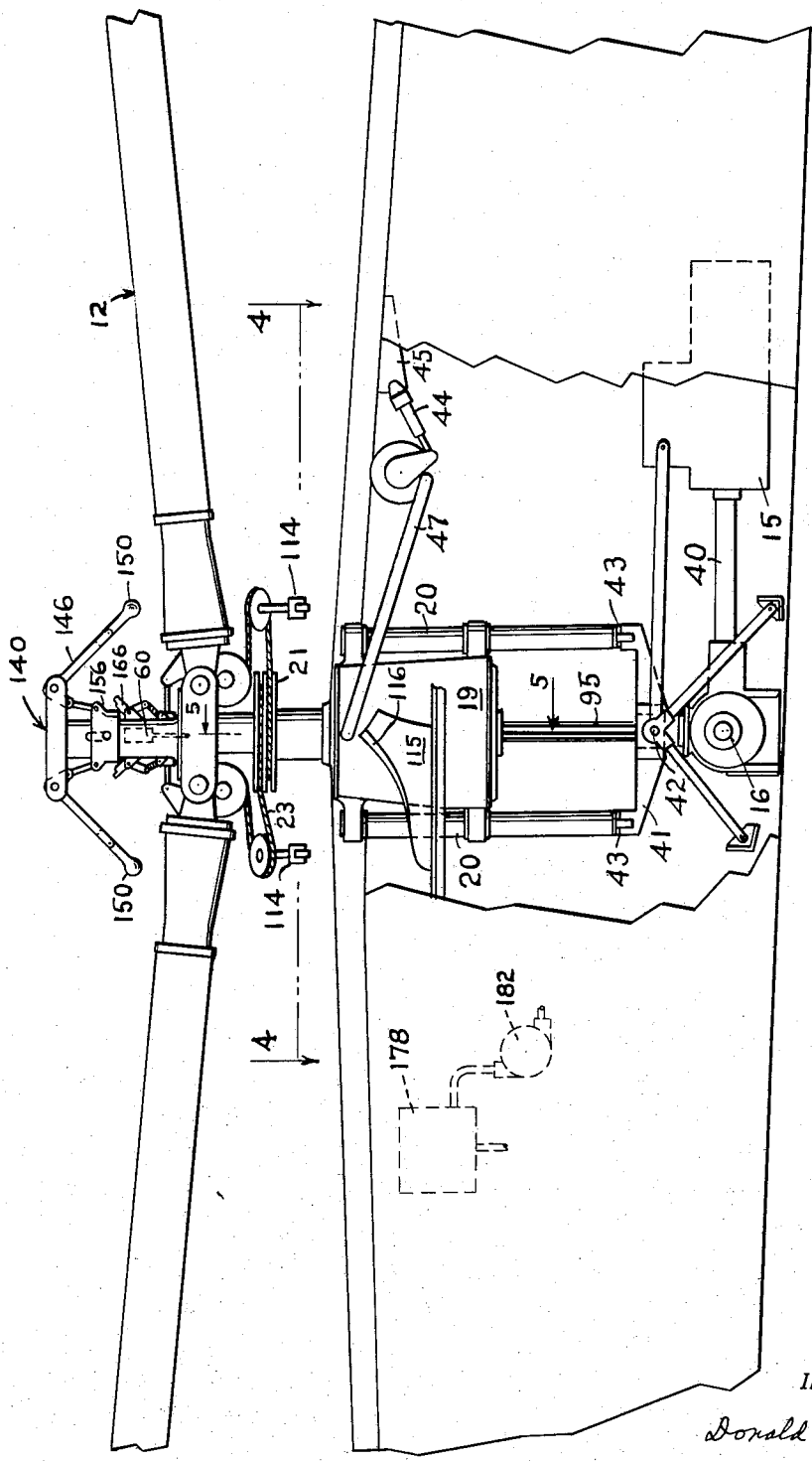
Figure 2 is an elevational view showing the rotor elevated above the fuselage in flight position.

Referring to Figures 2, 3 and 4 it is seen that the drive system consists of a short shaft 40 from power plant 15 to the lower part of central transmission 16 from which torque is distributed to the upper central transmission 19 and by shafting 17 to the two propellers 18 in the wings.

Upper central transmission 19 is resiliently mounted to reduce vibration and is retractable by means of hydraulic jacks 20. The mounting includes a yoke 41 which is mounted for fore and aft tilting movement about pivot connection 42. Lateral vibratory motion of the upper central transmission 19 occurs about hinges 43 whose horizontal axes extend in a fore and aft directions. Fore and aft vibratory motion of transmission 19 is damped by means of hydraulic dampers 44, one end being mounted to fuselage structure 45 and the other end mounted to a torque bar 46. A pair of links 47, 49 connect the top central portion of transmission 19 to torque bar 46, thus any fore and aft motion of the transmission is conveyed through links 47, 49, torque bar 46 and into dampers 44.

Lateral motion of the rotor is resisted by the diagonally disposed hydraulic damper 48 being secured at one end to link 47 near its transmission connection and at its other end to torque bar 46 adjacent to the connection of link 49 to torque bar 46. Universal joints 206 and 208 are provided at each end of links 47 and 49. Torque of the rotor is resisted by bar 46. Thus it is seen that these members serve to isolate the rotor so that vibrations induced in the plane of rotation are not transmitted to the structure.

A clutch 50 (see Fgure 3) is provided to declutch the rotor from the power section of the lower central transmission 16.

Referring to Figures 12, 13, 14, hub 15 is shown nonrotatably secured to hollow drive shaft 22, such as by a splined connection, and is provided with pairs of ears 52 for mounting the blades. Hinged to the ears 52 by pins 53 are the blades 12 by means of a yoked pitch shaft 54. Pitch bearings 55 are interposed between said shaft and housing 56.

Mechanism for applying negative coning to the blades is mounted to the top of hub 51. The negative coning mechanism causes the blades 12 to hinge downwardly so that the top surfaces of the blades complete the contour of the fuselage for reducing to a minimum the drag of the rotor when the aircraft is in fixed wing flight. The negative coning assembly includes for each blade a hydraulic actuator 57 pinned at one end to a bracket 58 which is secured to pitch shaft 54 and pinned at its other end to a second bracket 59 affixed to the top of the hub 51. A centrifugal valve 60 (Figure 17) applies pressure from the blade coning restrainers 57 during extension of the rotor from a non-flight position. Centrally located below, between the yoke arms of pitch shaft is pulley 61 mounted on bracket 62 which receives cable 23 and passes the same through the inboard portion of the blade.

Figures 6, 7, 8 and 9 show details of the rotor blade which is of a plural-section, telescopic sliding type. The inboard section 13 receives the outboard section 13a. Inboard section 13 comprises a milled spar 62 in its leading-edge and a milled trailing-edge spar 63 and said spars are maintained in spaced relation by skin 64. The outboard section 13a is similarly constructed, having a leading-edge spar 65 and a trailing edge spar 66 which are secured in spaced relation by skin 67. Spars 62 and 63 have internally milled tracks 68 and 69 respectively and receive the panel carriage 70 of the outboard blade section 13a which is shown schematically in Figure 6. A pair of fittings 71, 72 are spaced along the leading edge of the inboard portion of blade section 13a. Fitting 71 carries an integral L-shaped lug 73, a lead-lag roller 74, and a pitching roller 75. Fitting 72 likewise carries a lead-lag roller 76, a pitching roller 77, and an L-shaped lug 78. Spaced chordwise of fitting 71 on the trailing edge of blade section 13a a third fitting 79 secured thereto carries a wedge shaped lug 80 and a vertically disposed roller 81.

Figure 7:
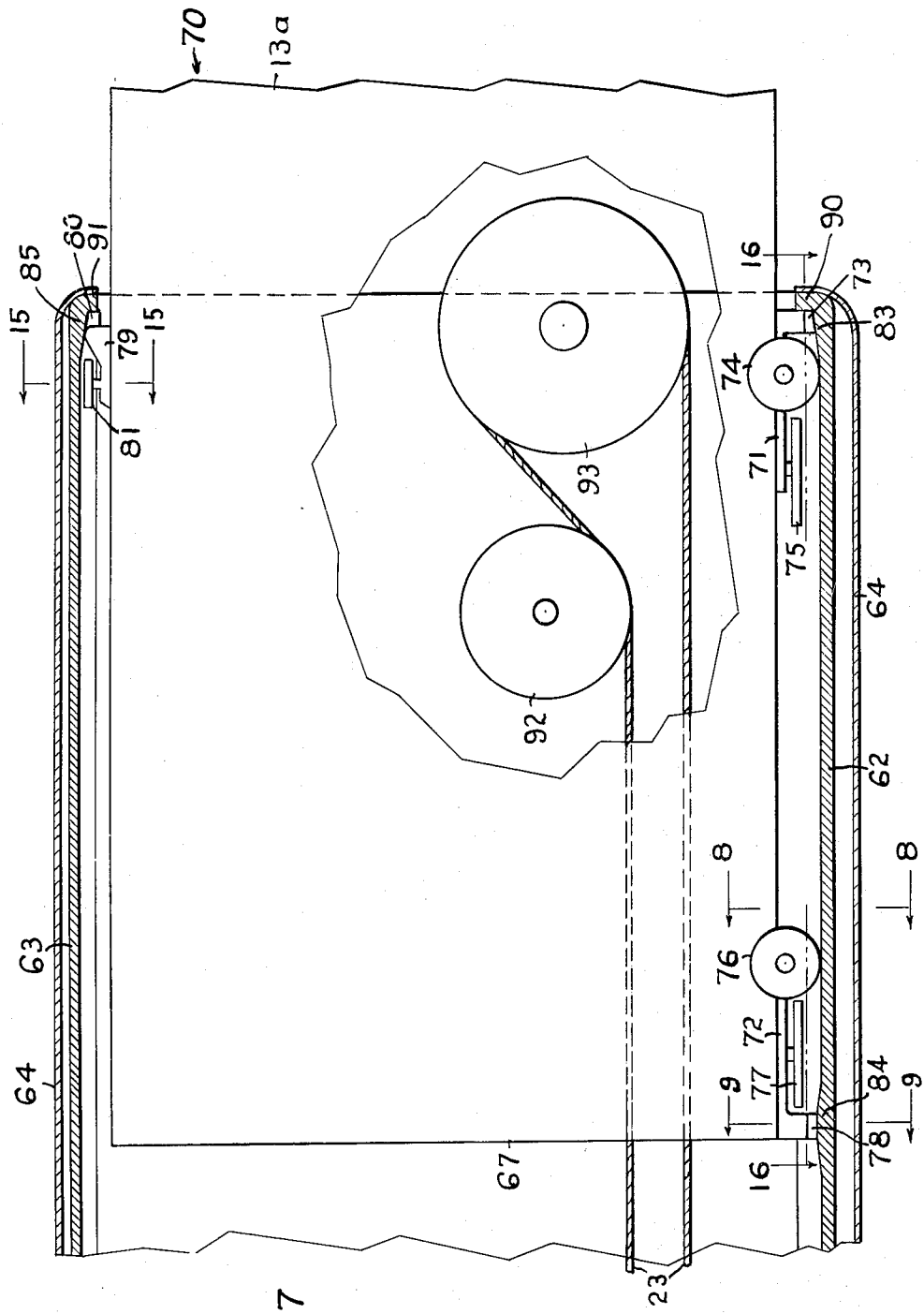
Figure 7 is a plan view similar to Figure 6 partly in section showing the manner of assembling adjacent telescoping blade section.

The aforementioned rollers 75 and 77 are vertically disposed and are of slightly larger diameter than the vertical height of lugs 73 and 78. The top and bottom plane surfaces of lug 73, are divergent and constitute wedge surfaces. The foremost surface 82 of lug 73 is inclined with respect to the longitudinal axis of blade section 13a and likewise constitutes a wedge surface. Lug 80 on fitting 79 also is formed with divergent wedge shaped surfaces. Referring to Figure 7 the carriage panel 70 of 13a carrying the three fittings 71, 72 and 79 is shown with the telescoping blade sections 13 and 13a completely extended. It is seen that lugs 73, 78 and 80 engage complemental wedge pads 83, 84 and 85 and travel in different planes as the blades are telescoped. Lug 73 projects a shorter distance from the leading edge of blade section 13a than lug 78 in order to provide clearance with wedge pad 84 when the blade sections are telescopically retracted. Wedge pads 86 and 87 (see Figure 16) engage the divergent top and bottom surfaces of lug 73, and wedge pads 88 and 89 on spar 62 engage the top and bottom surfaces of lug 78. Lug 73 is of less height than lug 78 so that no interference exists with pad 88 during retraction of the blades. Stops 90 and 91 (see Figure 7)

limit the degree of wedging action of lugs 73 and 80 with their complemental pads and restrain blade section 13a against the action of the centrifugal force which is developed in and carried by said section.

Lugs 73, 78 and 80 carry all of flapping reaction of the blade 13a when it is in extended position. The lugs in addition carry all of the lead-lag reactions of the blade. The lugs 73, 78 and 80 further carry all of the torsional reaction as the pitch angle of the blade is changed. Lugs 73 and 80 in conjunction with stops 90 and 91 retain the blade section 13a against the centrifugal force developed by said section. As the blade sections are telescopically retracted so that the lugs 73, 78 and 80 are moved past the aforementioned wedge pads, the rollers 75, 77, 81, 74 and 76 carry all of the loads. The lugs in this position of the blades do not make contact with the internally milled tracks 68 and 69 due to the fact that the diameters of the rollers are greater than the vertical and chordwise dimensions of the lugs. The rollers thus take all of the lead-lag, pitch, and flapping loads incurred by the blade sections in the telescoping process.

Blade section 13a is telescoped within blade section 13 by means of cable 23 and pulleys 92 and 93 mounted in the inboard portion of blade section 13a. One end of cable 23 is anchored to the inboard structure of blade section 13 by means of anchor fitting 94 (see Figure 12). Cable 23 is passed from said anchor fitting lengthwise through the inner portion of blade section 13, partially through blade section 13a, around guide pulley 92, completely around work pulley 93 and back through said blade sections to pulley 61 mounted on hub 51.

Figures 2 and 5 illustrate the mechanism for extending and retracting the rotor blades. The rotor 11 with its upper central transmission 19 is driven by a splined shaft 95 on which it slides for raising or lowering into the fuselage, the latter being accomplished by hydraulic jacks 20. It is to be noted, of course, that sliding takes place on the splines, only when the rotor is not rotating. The transmission includes a two part casing including a generally rectangular lower portion 96 and a conically tapered upper portion 97. Splined shaft 95 constitutes a power input or driving shaft and is coupled to rotor driven shaft 22 by means of a gear reduction unit 98. Power input shaft 95 drives the drive pinion P through spherical splines formed on the inner surface of pinion P, permitting angular motion of the transmission in relation to the input shaft 95. A speed reduction is accomplished between driving pinion P and driven gear 99. Driven gear 99 is formed integrally with gear 100 which drives gear 101 which in turn is keyed to rotor driven shaft 22 to which rotor hub 51 is affixed.

Cable 23 which telescopes the blade sections passes over pulleys 61 and 102 and is affixed to drum 21 which is concentric with rotor shaft 22. Pulley 102 is mounted to rotor shaft 22 by means of arm 103 which is fixed to said shaft 22 for rotation therewith. Cable 23 is wound on drum 21 by relative rotation between drum 21 and rotor shaft 22. Drum 21 is fixed to brake disc 106 by means of an intermediate torque transmitting shaft 107, said shaft being mounted on rotor shaft 22 by means of bearings 104 and 105. Mounted within the transmission housing 97 is a hydraulically actuated piston 109 which applies a predetermined amount of friction by means of a brake 110 tending to stop brake disc 106 and cable drum 21. Since the momentum in the rotor system 11 tends to continue its rotation, cable 23 winds up on drum 21 until the rotor blades are completely telescoped. Brake 110 then continues to apply a retarding torque until the rotor is stopped. When the rotor is stopped, a jaw clutch 112 (Figure 10) is used to lock the rotor to the drum 21. To do this a centrifugally operated valve 60 (see Figure 17) opens permitting pressure to actuate piston 111 connected to the jaw clutch 112 to positively lock drum 21 to rotor shaft 22 (Figure 10). Jaw clutch 112 is a ring-like member surrounding shaft 22 and is splined for vertical movement on said shaft. Clutch face 130 integral with the lower surface of jaw clutch 112 engages clutch face 132 integral with the upper surface of shaft 107. The two faces 130, 132 shown in engagement in Figure 5, 10 are locked by action of piston 111 movable within hydraulic cylinder 134 attached at its upper end to shaft 22 by means of bracket 136. A compression spring 138 engaging the lower surface of piston 111 and the bottom of cylinder 134 disengages said clutch faces upon release of hydraulic pressure. When centrifugal valve 60 is opened hydraulic pressure is fed to the top surface of piston 111 to move jaw clutch 112 in locking engagement with drum 21. The same hydraulic pressure is introduced to hydraulic actuator 57 to impart negative coning to the telescoped rotor blades.

The top of the rotor hub carries a fly-weight hydraulic-valve-actuating mechanism 140 (Figures 17, 18) which regulates the flow of hydraulic fluid to negative coning actuator 57 and jaw clutch 112. This mechanism comprises an upright hollow shaft 142 suitably bolted to hub 51. A cross head 144 is secured at the top of said shaft, and carries a pair of bell cranks 146 pivotally secured thereto by pivot pins 148. Flyweights 150 integral with rods 152 are hinged at 154 to the vertically extending arms of said bell cranks 146 for free oscillation thereon. The point of said pivot connection 154 between said arms is such that when said arms are in a locked position, the upper extremity of said rods 152 will swing inwardly as the flyweights swing outwardly under the influence of centrifugal force. The extremities of the horizontally disposed arms of bell cranks 146 are connected to a sleeve 156 concentric with and slidable upon the outer surface of said shaft 142 by means of links 158. Shaft 142 contains longitudinally disposed slots 160 which permit vertical movement of horizontally disposed pin 162, the ends of which are secured within the walls of sleeve 156. A pair of hinge ears 164 integral with shaft 142 are disposed in alignment with said crosshead 144 and hingedly carry a pair of latch members 166. The latch members pivot about their midportions, the top portion of said latch members being vertically disposed and notched as at 168 to abut the lower edge of sleeve 156, and the lower portion thereof forms an obtuse angle with said notched upper portion. A compression spring 170 is secured at one end to the lower portion of said latch and at its other end to the lower portion of said shaft. Axially aligned within shaft 142 and secured to pin 162 is rod 172 connected to spool 174 in cylinder 176 of centrifugal valve 60 suitably connected within said shaft (Figure 17). An oil reservoir 178 delivers oil through a conduit 180 to a pump 182. The oil is in turn forced from the pump through conduit 184 to cylinder 176 of centrifugally operated valve 60. With spool 174 in the up position as shown in Figure 17 return conduit 186 is closed and the oil flows around the circumferential aperture 188 of spool 174, through conduit 190, 194, and 196, thence to cylinders 134 and 57, thus causing pistons 111 and 192 to be actuated.

Actuation of piston 111 moves jaw clutch 112 to lock cable drum 21 to said shaft 22, and actuation of piston 192 moves blade 12 to apply negative coning to said blades.

In operation the flyweight hydraulic actuating mechanism 140, when the rotor is rotating slowly, positions spool 174 of valve 60 in an up position. This position permits oil to be delivered from reservoir 178 by means of pump to both the jaw clutch and the negative coning device. As the rotor speeds up the flyweights move outwardly under the influence of centrifugal force. As the rotor speed increases still more, the flyweights swing out still further and at a designated R. P. M. of the rotor the flyweights 150 through rods 152 will trip latches 166. The reaction of the flyweights on the vertical arms of bell cranks 146 causes said arms to move outwardly to correspondingly depress rods 158 and sleeve 156 (see Figure 2) and to close valve 60 by actuation of spool 174 against input of oil through conduit 184 from pump 182. The oil pressure in the jaw clutch cylinder 134 and the blade damping negative coning actuator 57 is relieved and oil in said actuators is permitted to reverse its flow in conduits 194, 196 and 190, through valve 60, conduit 186 and back to reservoir 178.

It will be observed that the negative coning actuator 57 is made up of a compartment 200. Conduit 196 is fed into compartment 200 and fluid pressure reacts against said wall and the inner face of piston 192 to move rod 204 outwardly.

In order that the rotor blades will be aligned fore and aft above the fuselage prior to retraction in recess 14, the following mechanism is provided (refer to Figures 3, 4 and 5). Rollers 114 are mounted to cross arm 103 and rotate with the rotor shaft 22. Cross arm 103 which is fixed to shaft 22 is aligned in parallel relationship with the longitudinal axes of the rotor blades. Cam 115 shown in Figures 3, 4, is mounted to fuselage structure and has laterally displaced lobes 116 and the lowest point 117 of the cam is located forward on the longitudinal axis. In operation, brake 110 which stops drum 21 is released, and the rotor is lowered. One of the rollers 114 contacts cam 115 and rotates the rotor until roller 114 has reached the lowest point 117 of the cam 115. In this position the rotor is rotated in alignment with the fuselage and is completely retracted for a high-speed fixed-wing flight of the aircraft.

Operation

*Retraction.*—In operation assume that the aircraft is in helicopter flight. Retraction of the rotor for conversion from helicopter flight to fixed wing flight is accomplished as follows: Rotor 11 is declutched from engine 15 by actuation of clutch 50. A predetermined amount of friction is applied to disc 106 by brake 110 which is actuated by means of a regulated amount of hydraulic pressure imparted to piston 109. This friction tends to stop rotation of disc 106 and drum 21. However, at the normal rotational speed of the rotor, centrifugal force acting on the ttelescoping blade sections is of such magnitude that the resulting tension on the cable 23 prevents brake 110 from stopping drum 21. The aerodynamic drag produced by the rotor in addition to the drag on disc 106 from brake 110 slows down the rotor to a speed at which the reduced centrifugal force in the rotor blades can no longer apply sufficient force to cable 23 to keep the drum 21 rotating at the same speed as the rotor. Drum 21 will then rotate slower than the rotor and cable 23 will wind itself on drum 21. As the telescoping sections of the rotor blades are pulled toward the center of rotation the speed of rotation, and therefore their centrifugal force, increases. When the centrifugal force builds up, the brake slippage will increase and permit drum 21 to rotate at or near the speed of the rotor. This slippage continues until the rotor speed has again decreased due to braking action and the centrifugal force is again low enough to permit brake 110 to stop or slow the disc 106 and drum 21, further winding the cables on the drum to retract the blades. This sequence continues until cable 23 is fully wound on drum 21 and rotor blades are fully telescoped.

After rotor blades 13, 13a are fully telescoped, the braking action continues until rotor 11 comes to a stop. When the rotor is stopped a jaw clutch 112 is actuated to lock the rotor to the drum 21. To do this, a centrifugal valve 60 (see Figure 17) opens, permitting pressure to actuate piston 111 connected to the jaw clutch 112 to positively lock drum 21 to rotor shaft 22. The same hydraulic pressure is introduced to hydraulic actuator 57 to impart negative coning to the telescoped rotor blades. Brake 110 is then disengaged and hydraulic jacks 20 are actuated to lower the rotor 11 and upper central transmission 19 into the fuselage as a unit. As the rotor is lowered, one of the rollers 114 contacts cam 115 and rotates the rotor until the roller 114 has reached the lowest point 117 of the cam 115. In this position the rotor is rotated in alignment with the fuselage and is completely retracted for high speed fixed wing flight.

*Extension.*—To extend the rotor system for helicopter flight hydraulic jacks 20 are actuated raising upper central transmission 19 and rotor 11. Rotation of rotor 11 is started by engaging clutch 50 (Figure 3). As rotor speed increases centrifugal valve 60 releases hydraulic pressure as previously described from hydraulic actuators 57, permitting the blades to cone. The rotor is meanwhile accelerated until synchronism with the engine is attained. Centrifugally controlled hydraulic valve 60 at the same time releases pressure from hydraulic cylinder 111 disengaging jaw clutch 112 and permitting relative rotation between drum 21 and rotor shaft 22. Centrifugal force from the rotor blades pulls cable 23 and rotates drum 21 in the same direction but at twice rotor speed. This follows because torque from drum 21 is transmitted to shaft 107 and to bevel gear 108 which is integral with the lower surface of said shaft. Bevel gear 108 meshes with planet pinions 118 which are carried by rotor shaft 22. Planet gears 118 also mesh with bevel gear 119 which is integral with the inner race 120 of overrunning clutch 121 and is carried by bearing 126. The outer race 123 of said clutch is fixed to gear case 19. Overrunning clutch 121 will permit rotation of inner race 120 only in the normal direction of rotation of the rotor as shown by arrow in Figure 11. This is accomplished by the wedging action of rollers 124 between the wedge shaped projections 125 integral with the inner race 120 and the outer race 123. The inner race 120 and the outer race 123 are held concentrically by bearings 126, 127. The aforementioned torque applied to bevel gear 108 in the direction of rotor rotation tends to rotate planet pinions 118 which in turn tend to rotate bevel gear 119 in a direction opposite to the rotor rotation. Rotation, however, of bevel gear 119 in this direction is prevented by overrunning clutch 121. Therefore, the reaction from planet pinions 118 is imparted to rotor shaft 22. This reaction is used to reduce deceleration of the rotor due to increase of the moment of inertia caused by extension of the blades. Thus the energy of the blades moving outwardly under centrifugal force is not dissipated as in prior devices but is converted to rotational energy in the rotor system.

The basic advantage of this system is that the energy contained in the rotating rotor prior to telescoping is used to telescope the blades and aid in decelerating the rotor. In like manner the centrifugal force of the rotor blades is used used to aid in accelerating the rotor during the extension part of the operation. This reduces the need for outside sources of power, reduces the complexity of the mechanism and is especially valuable in getting the rotors up to speed in the event of an engine failure.

Although only one form of the invention has been illustrated and described in detail, it will be apparent to those skilled in the art that various modifications may be made without departing from the scope of the appended claims.

What is claimed is:

1. An aircraft comprising a fuselage, a wing, forward propulsive means, a rotary wing system including a drive shaft, a hub mounted on said shaft, a rotor blade comprising telescoping blade sections mounted to said hub, means for telescopically retracting and extending said blade sections at a predetermined speed comprising a cable drum rotatably mounted on and concentric with said shaft, a cable secured to said drum and to said blade sections, a brake actuatable against said drum for stopping rotation of said drum, a bevel gear integral with said drum, an overrunning clutch, including an inner race rotatably mounted on said shaft, an outer race fixed to fuselage structure, a bevel gear integral with said inner race, planet gears carried by said drive shaft and meshing with said first and second bevel gears, said overrunning clutch permitting rotation of said inner race only in the normal direction of rotation of said rotor, whereby actuation of said brake against said cable drum causes relative rotation of said drum with respect to said shaft to cause retraction of said blade sections, and release of said brake with said cable wound upon said drum permits extension of said telescoped blade sections under the influence of centrifugal force reacting to exert a torque on said shaft acting in the normal direction of rotation thereof.

2. An aircraft comprising a fuselage, a wing, forward propulsive means, a rotary wing system including a drive shaft, a hub mounted on said shaft, a rotor blade comprising telescoping sections mounted to said hub, means for telescopically extending said sections at a predetermined speed, comprising a cable drum rotatably mounted on said fuselage and concentric with said shaft, a cable secured to said drum and to said sections, a first bevel gear integral with said drum, an overrunning clutch including an inner race rotatable on said shaft and an outer race fixed to said fuselage, said overrunning clutch permitting rotation of said inner race only in the normal direction of rotation of said rotor, a second bevel gear integral with said inner race, a planet gear carried by said drive shaft and meshing with said first and second bevel gears, whereby extension of said blade sections under the influence of centrifugal force exerts a torque on said shaft acting in the normal direction of rotation thereof.

3. An aircraft comprising a fuselage, a fixed wing, forward propulsive means, a lift sustaining rotor including a hub, means for rotating said hub, a radially extensible blade mounted on said hub, means for restraining the rate of extension of said rotor blade operatively connected to said hub, said fuselage, and said blade, said blade when moving radially outwardly under the influence of centrifugal forces actuating said rate restraining means to apply a rotational torque to said hub in its normal direction of rotation.

4. An aircraft comprising a fuselage, a fixed wing, forward propulsive means, a lift sustaining rotor including a hub, means for rotating said hub, a radially extensible rotor blade including telescoping sections mounted to said hub, said blade sections generating a centrifugal force in a direction to extend said blades when said hub is rotated, means for restraining the rate of extension of said rotor blades operatively connected to said hub, said fuselage and to said radially extensible sections, said extensible blade sections when moving radially outwardly under the influence of centrifugal forces operating to actuate said rate restraining means to apply a rotational torque to said hub in its normal direction of rotation.

5. An aircraft comprising a fuselage, a lift sustaining rotor mounted on said fuselage, said rotor including a hub and a radial extensible blade, said blade generating a centrifugal force acting in a direction to extend said blade radially when said rotor is rotated, a reeling element mounted for rotation on said fuselage, means connected to said blade and to said reeling element, torque transmitting means connected to said reeling element and to said rotor, said torque transmitting means including a force reacting connection to said fuselage, whereby outward radial movement of said blade exerts a torque on said rotor acting in the normal direction of rotation thereof.

6. An aircraft comprising a fuselage, a wing, forward propulsive means, a rotary wing system including a drive shaft, a hub mounted on said shaft, a rotor blade comprising telescoping sections mounted to said hub, means for telescopically extending said sections at a predetermined rate including a reeling element supported concentric with said shaft, means connecting said reeling element and said telescoping blade sections, an overrunning clutch including an inner race rotatable on said shaft and an outer race fixed to said fuselage, said inner race permitting rotation of said inner race only in the normal direction of rotation of said rotor and drive means interconnecting said innner race, said shaft, and said reeling element, whereby extension of said blade sections under the influence of centrifugal force exerts a torque on said shaft acting in the normal direction of rotation thereof.

7. An aircraft comprising a fuselage, a lift sustaining rotor including a hub mounted on said fuselage, a rotor blade including telescoping sections mounted to said hub, torque transmitting means operatively connected to said blade and said hub and operatively connected to said fuselage by an overrunning clutch to react between said hub and said fuselage such that the centrifugal force exerted by said blade acts as a driving torque on the hub in its normal direction of rotation.

References Cited in the file of this patent

UNITED STATES PATENTS

| | | |
|---|---|---|
| 1,855,084 | Alvistur | Apr. 19, 1932 |
| 2,094,105 | Myers | Sept. 28, 1937 |
| 2,437,789 | Robins | Mar. 16, 1948 |
| 2,464,285 | Andrews | Mar. 15, 1949 |
| 2,465,703 | Allen | Mar. 29, 1949 |